United States Patent
Håland

(10) Patent No.: US 9,267,606 B2
(45) Date of Patent: Feb. 23, 2016

(54) SEAL ARRANGEMENT FOR VALVE

(75) Inventor: Terje Håland, Randaberg (NO)

(73) Assignee: Terje Haland AS, Randaberg (NO)

( * ) Notice: Subject to any disclaimer, the term of this patent is extended or adjusted under 35 U.S.C. 154(b) by 85 days.

(21) Appl. No.: 14/000,474

(22) PCT Filed: Jul. 4, 2012

(86) PCT No.: PCT/NO2012/050131
§ 371 (c)(1),
(2), (4) Date: Sep. 4, 2013

(87) PCT Pub. No.: WO2013/066187
PCT Pub. Date: May 10, 2013

(65) Prior Publication Data
US 2014/0239212 A1   Aug. 28, 2014

(30) Foreign Application Priority Data
Nov. 1, 2011   (NO) .................................. 20111487

(51) Int. Cl.
*F16K 5/06*   (2006.01)
*F16K 5/20*   (2006.01)

(52) U.S. Cl.
CPC ............. *F16K 5/0663* (2013.01); *F16K 5/0678* (2013.01); *F16K 5/201* (2013.01); *Y10T 137/0508* (2015.04)

(58) Field of Classification Search
CPC ..... F16K 5/201; F16K 5/0678; F16K 5/0663; Y10T 37/0508
USPC .............. 251/160, 172, 180–181, 192, 315.1, 251/314–316
See application file for complete search history.

(56) References Cited

U.S. PATENT DOCUMENTS

| 3,097,823 A | 7/1963 | Kaiser |
| 3,118,650 A | 1/1964 | Cooper et al. |
| 3,171,429 A | 3/1965 | Sturmer et al. |
| 3,214,131 A | 10/1965 | Boldt et al. |

(Continued)

FOREIGN PATENT DOCUMENTS

| DE | 29 24 308 | 6/1979 |
| EP | 0128685 A1 | 5/1984 |

(Continued)

OTHER PUBLICATIONS

International Search Report, PCT International Application No. PCT/NO2012/050131, mailed Jan. 30, 2013.

(Continued)

*Primary Examiner* — Marina Tietjen
(74) *Attorney, Agent, or Firm* — Andrus Intellectual Property Law, LLP

(57) ABSTRACT

A valve seat arrangement (4) in a hydraulic valve (1) provided with a bidirectional secondary barrier (5) including a first, upstream seal (51) and a second, downstream seal (52) and an intermediate, axially movable seal-supporting element (53), the seal-supporting element (53) including, at a first end, an annular first seal abutment (531) surrounded by a second supporting abutment surface (534) displaced in the axial direction towards a valve seat (42); and the seal-supporting element (53) including, at a second end, an annular second seal abutment (532) surrounding a first supporting abutment surface (532) displaced in the axial direction away from the valve seat (42).

9 Claims, 3 Drawing Sheets

(56) References Cited

U.S. PATENT DOCUMENTS

| | | |
|---|---|---|
| 3,335,999 A | 8/1967 | Lowrey |
| 3,656,711 A | 4/1972 | Toelke |
| 3,895,776 A | 7/1975 | Laurens |
| 3,990,465 A | 11/1976 | Allen |
| 4,319,734 A | 3/1982 | Acar |
| 4,566,482 A | 1/1986 | Stunkard |
| 4,658,847 A | 4/1987 | McCrone |
| 6,966,537 B2 | 11/2005 | Sundararajan |
| 7,032,880 B2 | 4/2006 | Scaramucci |
| 2002/0185625 A1 | 12/2002 | Gosling |
| 2003/0178595 A1 | 9/2003 | Koester et al. |
| 2004/0178381 A1 | 9/2004 | Sundararajan |
| 2005/0205826 A1 | 9/2005 | Scaramucci |
| 2008/0179558 A1 | 7/2008 | Lloyd |
| 2010/0090146 A1 | 4/2010 | Keeper et al. |
| 2011/0037010 A1 | 2/2011 | Parks, Jr. |
| 2012/0211690 A1 | 8/2012 | Anderson et al. |

FOREIGN PATENT DOCUMENTS

| | | |
|---|---|---|
| GB | 2087517 A | 9/1981 |
| WO | 2012116075 A1 | 8/2012 |

OTHER PUBLICATIONS

Menz, B. et al., Skid integrators get to grips with rubing challenge, Offshore Engineer, p. 54-56 (Jan. 2010).

Written Opinion, PCT International Application No. PCT/NO2012/050131, mailed Jan. 30, 2013.

International Preliminary Report on Patentability, PCT International Application No. PCT/NO2012/050131, mailed May 6, 2014.

SEAL ARRANGEMENT FOR VALVE

CROSS-REFERENCE TO RELATED APPLICATIONS

This application is the U.S. national stage application of International Application PCT/NO20121050131, filed Jul. 4, 2012, which international application was published on May 10, 2013, as International Publication WO 2013/066187 in the English language. The International Application claims priority of Norwegian Application No. 20111487, filed Nov. 1, 2011, which Norwegian application was granted as Norwegian Patent No. 332,818 on Jan. 21, 2013. Both the international and Norwegian applications are hereby incorporated by reference in their entireties.

A device for a valve-seat arrangement in a hydraulic valve including a bidirectional secondary barrier including a first, upstream seal and a second, downstream seal and an intermediate, axially displaceable seal-supporting element is described.

For safety reasons, in some areas of application of hydraulic equipment, double sealing barriers are required between a hydraulic-fluid path and the surroundings, for example by two sets of seals being used in nipples et cetera. For static elements, this is simple, but for movable elements in a high-pressure hydraulic system, for example a closing element in the form of a valve ball or slide in a shut-off valve in hydraulic systems at pressures of 700-800 bars, strict requirements are placed on the functionality and durability of the seals. For high-pressure valves for subsea installation and with limited possibilities of inspection, there are requirements for the use of so-called unidirectional seals, that is to say lip seals that resist pressure only from one side, made of PTFE or PEEK polymer material (PTFE=polytetrafluorethylene, PEEK=polyether-etherketone).

In a valve of this kind, a first sealing barrier is formed by a valve seat, integrated in a valve housing, sealingly abutting against the closing element of the valve. The valve seat abuts against the closing element by a spring system applying an initial push force to a valve-seat holder, in which the valve seat is arranged, by means of a spring system. Additional push force is provided by a hydraulic pressure against a piston surface arranged in the valve-seat holder by a first lip seal, forming a second sealing barrier, being pushed in the direction of an abutment in the valve-seat holder.

For valves constructed in such a way that a pressure build-up downstream of the closing element will apply pressure to the unidirectional seal, against its back, it has been usual to apply two lip seals, the second seal facing the opposite way and being moved, when hydraulic pressure is applied, towards an abutment in the valve housing.

It is a known problem that when two such opposite lip seals cooperate and the hydraulically generated compressive force is pushing the right-facing lip seal in the direction of its abutment, the opposite "wrong-facing" seal is simultaneously subjected to a mechanical load, for example via a shape-stabilizing so-called "hat ring", and this load quickly results in the lip seal getting a lasting deformation, for example by the seal material being squeezed in between the valve housing and the supporting ring (hat ring) or between the valve-seat holder and the hat ring. The durability of so-called bidirectional seals formed from opposite lip seals is thereby severely limited in relation to the requirements placed on high-pressure valves of this kind.

The invention has for its object to remedy or reduce at least one of the drawbacks of the prior art or at least provide a useful alternative to the prior art.

The object is achieved through features which are specified in the description below and in the claims that follow.

In what follows, the term "closing element" is used for the valve element that, by rotation or displacement, alternates between a position in which a valve passage is closed and a position in which the valve passage is open, typically a valve ball in a ball valve and a slide in a slide valve.

In what follows, the term "valve housing" is used as a collective term for a valve body and any nipples and sleeves that are necessary for reasons of production to provide installation passages for the internal components of the valve.

For a hydraulic valve in which two opposite, combined unidirectional seals of the lip type are used as a secondary barrier effective both upstream and downstream of a closing element, an arrangement is provided, which includes an annular seal-supporting element arranged between the two seals mentioned and which exhibits abutment surfaces arranged for supporting abutment against shoulder portions on, respectively, a valve-seat holder and a valve housing, the abutment surfaces being arranged radially and axially separated from the abutment surfaces of the seals. Thereby a hydraulic pressure against one seal will result in the seal-supporting element being moved into abutment against the valve-seat holder, alternatively the valve housing, without the compressive force generated being transmitted via the other one of the seals, applying a compressive force to it in a direction forcing the seal lips against an abutment in such a way that the seal is deformed.

A valve seat forming a first sealing barrier between the valve housing and the closing element, by the valve seat abutting against the closing element, is arranged in the spring-loaded valve-seat holder in a manner known per se, there being a spring system, for example one or more disc springs, arranged between the valve-seat holder and the valve housing. At a first end, a stepped, annular seal-supporting element is provided with a first, annular seal-abutment surface which extends from the inner circumference of the seal-supporting element and is arranged to receive an upstream, first seal. At a second end of the seal-supporting element, a first abutment surface is arranged, extending radially outwards from the inner circumference of the seal-supporting element and being arranged to abut against a shoulder portion on the valve-seat holder, said shoulder portion facing away from the valve seat. Outside the first abutment surface and axially displaced towards the valve seat, a second, annular seal-abutment surface is arranged, extending radially inwards from the outer circumference of the seal-supporting element and being arranged to receive a downstream, second seal. At the first end of the seal-supporting element, a second abutment surface is arranged outside the first seal-abutment surface, extending radially inwards from the outer circumference of the seal-supporting element and being arranged to abut against a shoulder portion on the valve housing, said shoulder portion facing the valve seat.

The first, annular seal-abutment surface is complementary to the cross section of a first annular space formed between the valve-seat holder and the valve housing, and the second annular seal-abutment surface is complementary to the cross section of a second annular space formed between the valve-seat holder and the valve housing, the clearance between a seal-abutment surface and the walls of the respective annular space, which are formed by the valve housing and the valve-seat holder, being within the sizes that provide effective support for the seal.

As a valve will include a corresponding valve arrangement on the opposite side of the closing element (downstream), there may be, by a pressure build-up downstream of the closing element, a pressure build-up on the second seal because of, for example, leakage across a second, downstream valve seat.

It is within the scope of the invention for the second sealing barrier to be dimensioned in such a way that it will make a positive pressure contribution for the valve seat in all situations, meaning that a hydraulic pressure against one of the seals will generate a positive compressive force from the valve seat against the closing element. This is provided by the outer diameter of the first seal being larger than the diameter of the contact circle of the valve seat against the closing element, possibly the inner diameter of the contact surface (for a situation in which the valve seat and/or the abutment surface of the closing element against the valve seat are/is worn, so that there is an extended contact surface). For the second seal, it applies that its inner diameter is smaller than the diameter of the contact circle of the valve seat against the closing element, possibly the outer diameter of the contact surface (for a situation in which the valve seat and/or the abutment surface of the closing element against the valve seat are/is worn, so that there is an extended contact surface).

It is also within the scope of the invention for the second sealing barrier to be dimensioned for being balanced, meaning that independently of which side of the second sealing barrier hydraulic pressure appears on, the valve seat will apply the same compressive force to the valve seat. This has been achieved by the area of a ring surface with an internal diameter corresponding to the inner diameter of the first seal and an external diameter equal to the contact circle of the valve seat against the closing element, possibly the internal diameter of the contact surface, being equal to the area of a ring surface with an external diameter corresponding to the outer diameter of the second seal and an internal diameter equal to the contact circle of the valve seat against the closing element, possibly the external diameter of the contact surface.

The invention relates, more specifically, to a device for a valve-seat arrangement in a hydraulic valve provided with a bidirectional secondary barrier including a first, upstream seal and a second, downstream seal and an intermediate, axially displaceable seal-supporting element, characterized by the seal-supporting element including, at a first end, an annular first seal abutment surrounded by a second supporting abutment surface displaced in the axial direction towards a valve seat; and the seal-supporting element including, at a second end, an annular second seal abutment surrounding a first supporting abutment surface displaced in an axial direction away from the valve seat.

The first seal abutment may be complementary to a seal base of the first seal; and correspondingly, the second seal abutment may be complementary to a seal base of the second seal.

The first supporting abutment surface may extend radially outwards from an inner diameter of the seal-supporting element; and correspondingly, the second supporting abutment surface may extend radially inwards from an outer diameter of the seal-supporting element; the first supporting abutment surface being arranged to abut supportingly against a first shoulder arranged in a valve-seat holder, and the second supporting abutment surface being arranged to abut against a shoulder arranged in a valve housing.

The outer diameter of the first seal may be at least as large as an inner diameter of the contact surface of a valve seat against a closing element; correspondingly, the outer diameter of the contact surface may be at least as large as the inner diameter of the second seal; and the inner diameter of the first seal may be smaller than the inner diameter of the second seal; and correspondingly, the outer diameter of the second seal may be larger than the outer diameter of the first seal.

The seals may be provided with two opposite seal lips projecting in an axial direction away from a seal base.

The diameter of the inner element circumference may correspond to an inner diameter of the seal base of the first seal, and the diameter of the outer element circumference may correspond to an outer diameter of the seal base of the second seal.

The seal-supporting element may be an assembly of a first hat ring, a middle hat ring and a second hat ring.

The middle hat ring and the first hat ring may exhibit inner diameters that are equal to the internal diameter of the first seal base; and the middle hat ring and the second hat ring may exhibit outer diameters which are equal to the external diameter of the second seal base.

The area of a ring surface with an external diameter equal to the outer diameter of the first seal and an internal diameter equal to the inner diameter of the contact surface of the valve seat may be equal to the area of a ring surface with an internal diameter equal to the inner diameter of the second seal and an external diameter equal to the outer diameter of the contact surface of the valve seat.

The hydraulic valve may include two identical valve-seat arrangements.

In what follows, an example of a preferred embodiment is described, which is visualized in accompanying drawings, in which.

Figure 1:
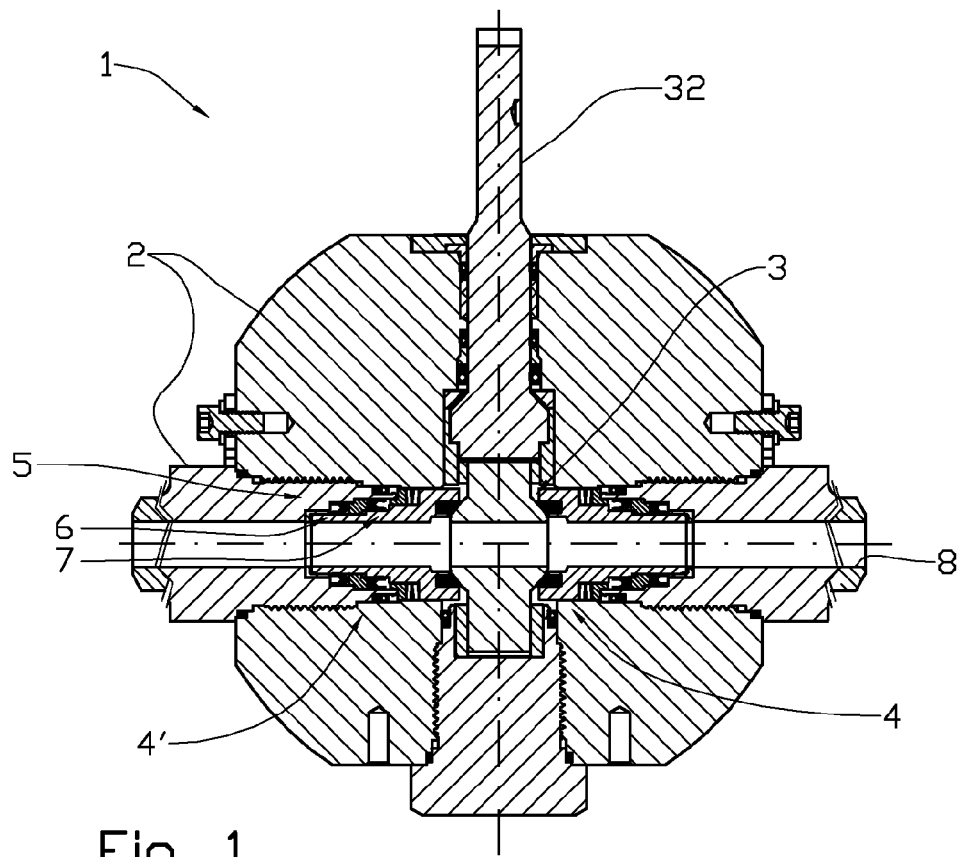
FIG. 1 shows a longitudinal section through a ball valve in accordance with the invention.

In the figures, the reference numeral 1 indicates a hydraulic valve, in which a valve housing 2 accommodates a closing element 3, shown here as a valve ball of a kind known per se, connected to a valve stem 32, a valve-seat arrangement 4 and a bidirectional secondary sealing barrier 5 arranged in first and second annular spaces 6, 7 arranged between a portion of the valve-seat arrangement 4 and a portion of the valve housing 2. The valve 1 is symmetric around a transverse axis constituted by the centre axis of the closing element 3, shown here as the rotational axis of the valve ball 3. A second valve-seat arrangement 4' identical to the former valve arrangement 4 is thereby arranged downstream around the centre bore 8. In what follows, only the former valve-seat arrangement 4 is discussed.

Figure 2:
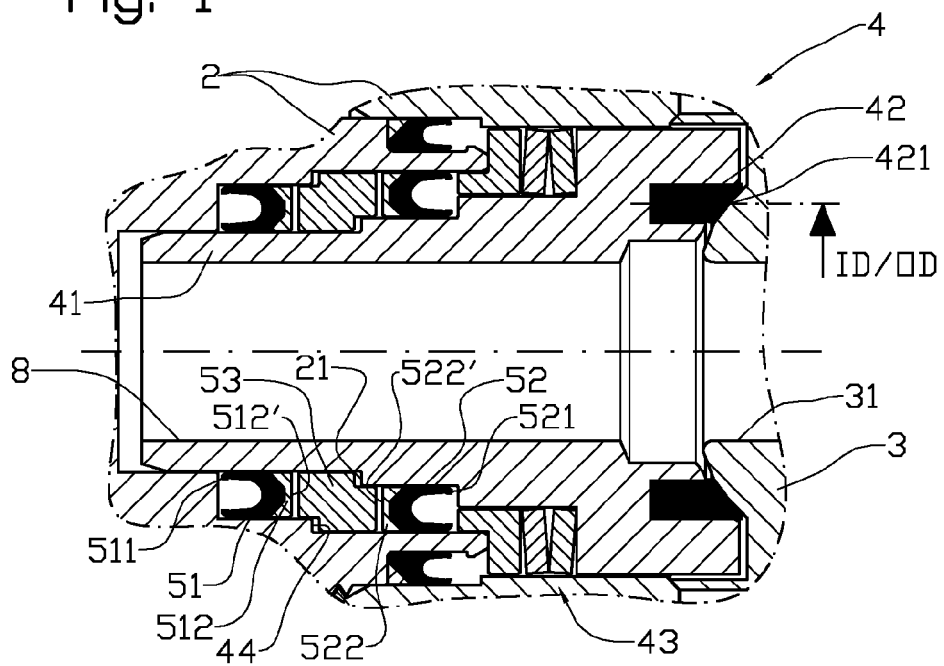
FIG. 2 shows, on a larger scale, a portion of the longitudinal section of the ball valve, in which a valve-seat arrangement includes a bidirectional secondary barrier provided by two unidirectional lip seals and a stepped seal support.
Figure 3:
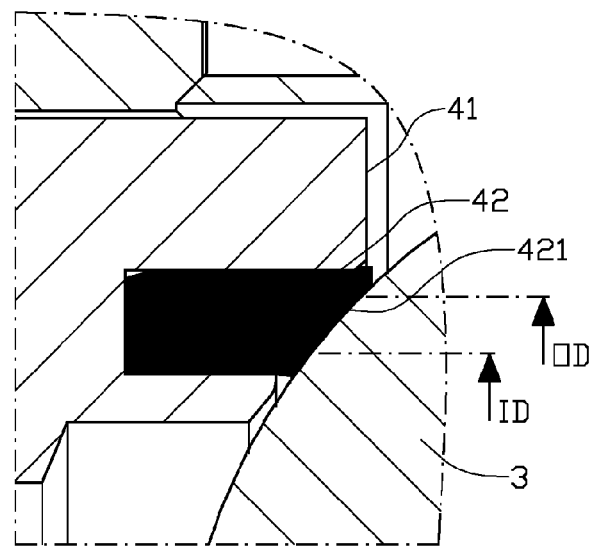
FIG. 3 shows, on an even larger scale, a section of a valve seat which is worn and is abutting against a closing device by an abutment surface indicated by inner and outer diameters.

Reference is now made to FIG. 2, in which the valve-seat arrangement 4 is shown in greater detail. A valve seat 42 abutting against a surface of the closing element 3 is arranged in an axially displaceable valve-seat holder 41. The valve seat 42 will initially abut against the closing element 3 by a contact surface 421 which, when the valve seat 42 and/or the closing element 3 are/is not worn, is so narrow that the contact surface has approximately the shape of a contact circle as it is suggested in FIG. 2. The contact surface 421 exhibits an inner diameter ID and an outer diameter OD (see also FIG. 3). A centre bore 8 extends through the valve 1, and a centre opening 31 arranged in the closing element 3 forms, in a manner known per se, part of the centre bore 8 when the valve 1 is open. In the open position of the valve 1, the valve seat 42 surrounds the centre opening 31 in a manner known per se, forming a primary sealing barrier.

The valve seat arrangement 4 includes a spring system 43 which applies an initial, axial push force to the valve-seat holder 41 and thereby the valve seat 42 in the direction of the closing element 3.

The secondary sealing barrier 5 includes a first, upstream seal 51 of the unidirectional lip seal type, formed, for special purposes, from a PTFE or PEEK polymer material to provide sufficient durability in long-term use under high pressure. The first seal 51 is arranged with a seal base 512 facing the valve seat 42 and seal lips 511 projecting axially away from the valve seat 42. Correspondingly, a second, downstream seal 52 of the same type is arranged with a seal base 522 facing away from the valve seat and seal lips 521 projecting axially towards the valve seat 42. In a manner known per se, the seal bases 512, 522 exhibit an inner diameter which is larger and an outer diameter which is smaller than the nominal inner and outer diameters $ID_1$, $ID_2$, $OD_1$, $OD_2$, respectively, of the seals 51, 52 (see FIG. 4).

The secondary sealing barrier 5 is arranged in a balanced way, that is to say so that independently of which side of the sealing barrier 5 is subjected to hydraulic pressure, the sealing barrier will work to provide a hydraulic pressure that will push the valve-seat holder 41, and thereby the valve seat 42, against the closing element 3 so that the sealing function is enhanced. This is achieved by the outer diameter $OD_1$ of the first, upstream seal 51 being at least as large as the inner diameter ID of the contact surface 421. Thereby an effective hydraulic piston surface that is active when there is an overpressure upstream of the closing element will be provided, said hydraulic piston surface being formed by an area defined by the outer diameter $OD_1$ of the first seal 51 and the inner diameter ID of the contact surface, by the very fact of the pressure against the area of the seal and valve-seat holder that lies inside the inner diameter of the contact surface ID being balanced by the hydraulic pressure exerted on the part of the valve seat 42 and an adjacent front portion of the valve-seat holder 41 that lies within the inner diameter ID of the contact surface. For a given inner diameter ID of the contact surface 421 of the valve seat, the hydraulic pressure contribution against the valve seat 42 is thereby determined only by the outer diameter $OD_1$ of the first seal 51. The inner diameter $ID_1$ of the first seal 51 is chosen to be such that a valve-seat shoulder 44 is provided on the valve-seat holder 41, the valve-seat shoulder 44 facing the first seal 51.

Correspondingly, the inner diameter $ID_2$ of the second, downstream seal 52 is chosen to be such that it is at least as large as the outer diameter OD of the contact surface 421. Thereby an effective hydraulic piston surface that is active when there is an overpressure downstream of the closing element and hydraulic fluid is leaking past the primary sealing barrier and around the closing element 3 will be provided, said hydraulic piston surface being constituted by an area defined by the inner diameter $ID_2$ of the second seal 52 and the outer diameter OD of the contact surface, by the very fact of the pressure against the seal area lying outside the outer diameter OD of the contact surface being balanced by the hydraulic pressure exerted on the part of the valve seat 42 and an adjacent front portion of the valve seat holder 41 that lies outside the outer diameter OD of the contact surface. The hydraulic pressure contribution against the valve seat 42 located downstream is thereby determined only by the inner diameter $ID_2$ of the second seal 52. The outer diameter $OD_2$ of the second seal 52 is chosen to be such that a valve-housing shoulder 21 is provided in the valve housing 2, the valve-housing shoulder 21 facing the second seal 52 and being arranged with a larger distance to the valve seat 42 than the valve-seat shoulder 44.

Said shoulders 21, 44 are arranged in a transition portion between the annular spaces 6, 7.

Figure 4:
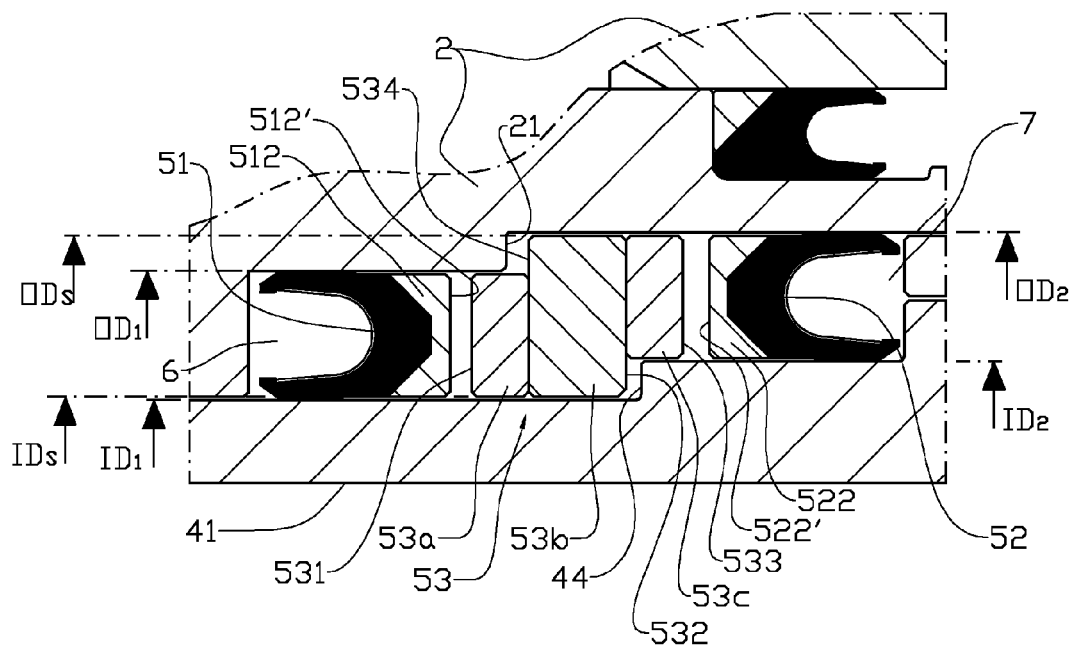
FIG. 4 shows a section of the valve-seat arrangement, in which the seal support is shown in an alternative embodiment.

A seal-supporting element 53 is arranged between the valve-housing shoulder 21 and the valve-seat shoulder 44. In one embodiment, as it is shown in FIGS. 1, 2, 5 and 6, the seal-supporting element 53 is provided as a stepped ring element. In another embodiment, as it is shown in FIG. 4, the seal-supporting element 53 is provided as an assembly of first and second hat rings 53a, 53c with an intermediate middle hat ring 53b, the inner diameters $ID_S$ of the first hat ring 53a and the middle hat ring 53b being identical, and the outer diameters $OD_S$ of the second hat ring 53c and the middle hat ring 53b being identical.

In a first, upstream end portion facing the first seal 51, a first seal abutment 531 (see FIG. 4) is arranged, arranged to supportingly receive the seal base 512 of the first seal 51, the first seal abutment 531 being complementary to the bottom surface 512' of the seal base 512. In a second, downstream end portion of the seal-supporting element 53, a first supporting abutment surface 532 is arranged, arranged to abut supportingly against the valve-seat shoulder 44.

A second seal abutment 533 arranged to supportingly receive the seal base 522 of the second seal 52 surrounds the first supporting abutment surface 532 and is axially displaced in the direction of the valve seat 42, the second seal abutment 533 being complementary to the bottom surface 522' of the seal base 522. In the first, upstream end portion of the seal-supporting element 53 and surrounding the first seal abutment 531 and axially displaced towards the valve seat 42, a second supporting abutment surface 534 arranged to abut supportingly against the valve-housing shoulder 21 is arranged.

Figure 5:
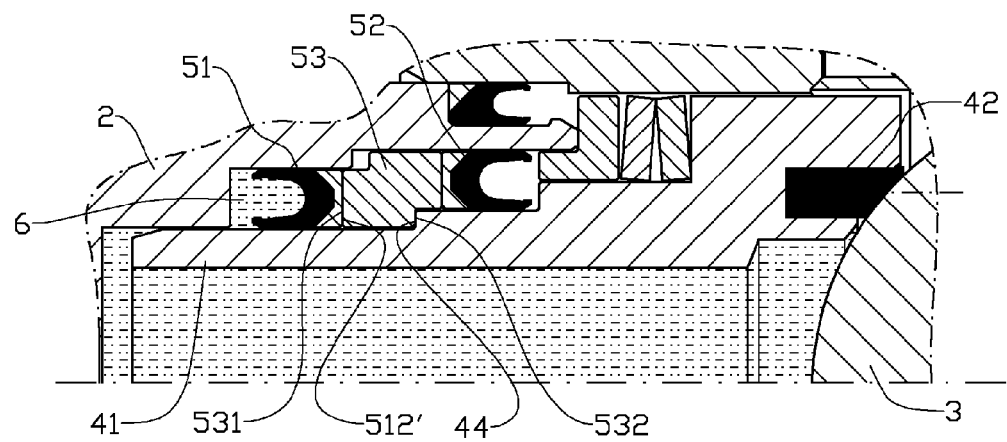
FIG. 5 shows, on a smaller scale, a section of an upstream valve-seat arrangement, in which the closing element is closed and a first seal is subjected to a hydraulic pressure, it having moved the seal hat ring into abutment against a valve-seat shoulder.

When an upstream, hydraulic pressure is applied to the secondary sealing barrier 5, as it is illustrated in FIG. 5, the first seal 51 is pushed against the seal-supporting element 53 which in turn is moved axially in the direction of the valve seat 42 into abutment against the valve-seat shoulder 44 without the second seal 52 being loaded from the base side so that the seal lips 521 are being deformed. The hydraulic pressure applies a load to the valve seat 42 that comes in addition to the initial load generated by the spring system 43. Because of the size of the outer diameter $OD_1$ of the seal 51 in relation to the inner diameter ID of the contact surface 421 of the valve seat 42, as it has been explained above, the load applied hydraulically will always be a positive one, that is to say of such direction that the valve seat 42 is pushed further against the closing element 3. This situation also applies to the first seal 51 in the second valve-seat arrangement 4' (see FIG. 1) when the seal 51 is subjected to a hydraulic pressure on the opposite side of the closing element 3.

Figure 6:
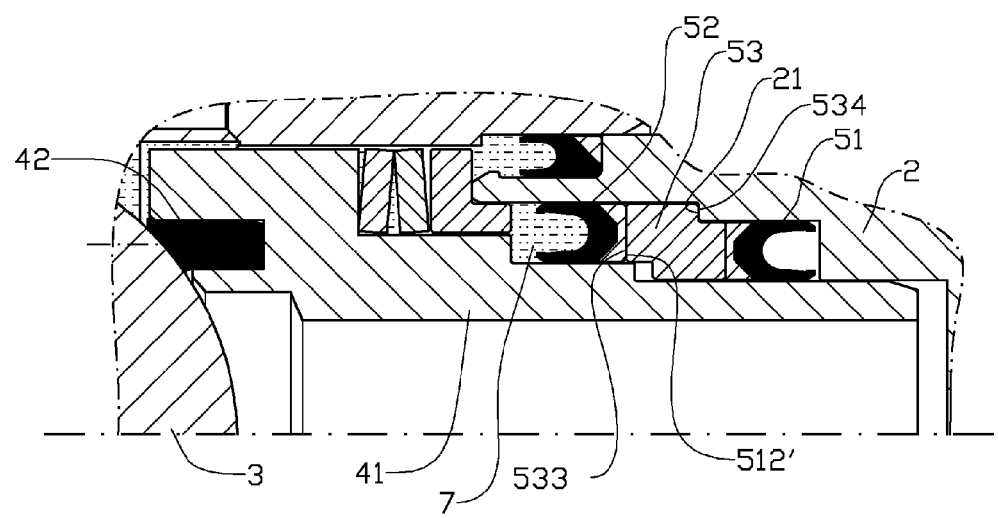
FIG. 6 shows, on the same scale, a section of a downstream valve-seat arrangement, wherein the closing element is closed and a second seal is subjected to a hydraulic pressure due to leakage past the closing element, the second seal having pushed the seal hat ring into abutment against a valve-housing shoulder.

When a downstream, hydraulic pressure is applied to the secondary sealing barrier 5, as it is illustrated in FIG. 6, that is to say a pressure is being built up on the opposite side of the closing element 3 and there is a leakage around the closing element 3 to the upstream side of the closing element 3, the second seal 52 is pushed against the seal-supporting element 53 which, in turn, is moved axially in the direction away from the valve seat 42 into abutment against the valve-housing shoulder 21 without the first seal 51 being loaded from the base side so that the seal lips 511 are being deformed. A hydraulic pressure is then built up in the second annular space 7, and this hydraulic pressure applies a load to the valve seat 42 that comes in addition to the initial load that is generated by the spring system 43. Because of the size of the internal diameter $ID_2$ of the seal 52 in relation to the outer diameter OD of the contact surface 421 of the valve seat 42, as it has been explained above, the load applied hydraulically will always be a positive one, that is to say of such a direction that the valve seat 42 is pushed further against the closing element 3. This situation also applies to the second seal 52 of the first valve-seat arrangement 4 (see FIG. 1) when the seal 52 is subjected to a hydraulic pressure on the opposite side of the closing element 3.

The invention claimed is:

1. A device for a valve-seat arrangement in a hydraulic valve provided with a bidirectional secondary barrier including a first, upstream seal and a second, downstream seal and an intermediate, axially movable seal-supporting element, wherein:
    the seal-supporting element includes, at a first end, an annular first seal abutment surrounded by a second supporting abutment surface displaced in an axial direction towards a valve seat;
    the seal-supporting element includes, at a second end, an annular second seal abutment surrounding a first supporting abutment surface displaced in the axial direction away from the valve seat;
    the first supporting abutment surface extends radially outwards from an inner diameter of the seal-supporting element;
    the second supporting abutment surface extends radially inwards from an outer diameter of the seal-supporting element; and
    the first supporting abutment surface is arranged to abut supportingly against a first shoulder arranged in a valve-seat holder, and the second supporting abutment surface is arranged to abut against a second shoulder arranged in a valve housing.

2. The device of claim 1, wherein:
    the first seal abutment is complementary to a seal base of the first seal; and
    the second seal abutment is complementary to a seal base of the second seal.

3. The device of claim 2, wherein the inner diameter of the seal-supporting element corresponds to an inner diameter of the seal base of the first seal, and the outer diameter of the seal-supporting element corresponds to an outer diameter of the seal base of the second seal.

4. The device of claim 1, wherein;
    an outer diameter of the first seal is at least as large as an inner diameter of a contact surface of the valve seat against a closing element;
    an outer diameter of the contact surface of the valve seat is at least as large as an inner diameter of the second seal;
    an inner diameter of the first seal is smaller than the inner diameter of the second seal; and
    an outer diameter of the second seal is larger than the outer diameter of the first seal.

5. The device of claim 4, wherein an area of a first ring surface having an external diameter equal to the outer diameter of the first seal and an internal diameter equal to the inner diameter of the contact surface of the valve seat is equal to an area of a second ring surface having an internal diameter equal to the inner diameter of the second seal and an external diameter equal to the outer diameter of the contact surface of the valve seat.

6. The device of claim 1, wherein the first and second seals are each provided with two opposite seal lips projecting in the axial direction away from a seal base.

7. The device of claim 1, wherein the seal-supporting element is an assembly of a first hat ring, a middle hat ring and a second hat ring.

8. The device of claim 7, wherein:
    the middle hat ring and the first hat ring exhibit internal diameters that are equal to an internal diameter of a seal base of the first seal; and
    the middle hat ring and the second hat ring exhibit outer diameters that are equal to an external diameter of a seal base of the second seal.

9. The device of claim 1, wherein the hydraulic valve includes two identical valve-seat arrangements.

* * * * *